(No Model.)　　　　　　　　　　　　　　　　2 Sheets—Sheet 1.

J. W. HYATT.
MEANS FOR CLEANSING FILTER DIAPHRAGMS.

No. 364,935.　　　　　　　　　Patented June 14, 1887.

Attest:
L. Lee.
Frederick C. Fischer.

Inventor.
J. W. Hyatt per Crane & Miller
attys (No Model.) 2 Sheets—Sheet 2.

J. W. HYATT.
MEANS FOR CLEANSING FILTER DIAPHRAGMS.

No. 364,935. Patented June 14, 1887.

Attest:
L. Lee.
F. C. Fischer.

Inventor.
John W. Hyatt per
Crane & Miller, Attys.

UNITED STATES PATENT OFFICE.

JOHN W. HYATT, OF NEWARK, NEW JERSEY.

MEANS FOR CLEANSING FILTER-DIAPHRAGMS.

SPECIFICATION forming part of Letters Patent No. 364,935, dated June 14, 1887.

Original application filed November 23, 1886, Serial No. 219,574. Divided and this application filed March 7, 1887. Serial No. 229,948. (No model.)

*To all whom it may concern:*

Be it known that I, JOHN W. HYATT, a citizen of the United States, residing at Newark, Essex county, New Jersey, have invented certain new and useful Improvements in Means for Cleansing Filtering-Diaphragms, fully described and represented in the following specification and the accompanying drawings, forming a part of the same.

This application is a division of my patent application No. 219,574, filed November 23, 1886, for method and apparatus for cleansing filtering-surfaces, and includes matter which was not claimed in the said application, as it presented a modification of that claimed therein.

My present improvement is applicable to any filter in which loose abrading material is agitated by a current of water in contact with the surfaces of porous filtering-diaphragms to remove the impurities deposited thereon; and the object of the invention is to avoid the agitation of the abrading material in separate sections by forming a strong current of water by a pump for agitating the abrading material and returning that part of the fluid which is not filtered again to the pump. By this construction the abrading material is caused to operate more effectively, the pump affording a means for forcing through the filter a volume of water greater than the porous diaphragms are capable of filtering.

Figure 1:
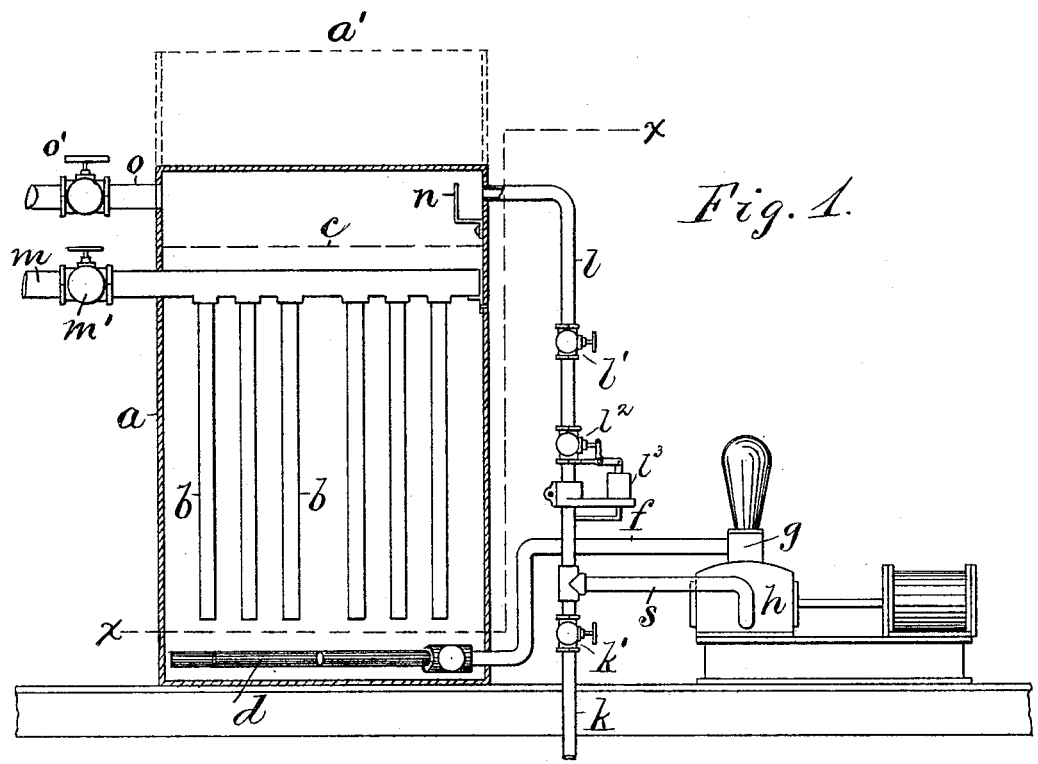
Figure 2:
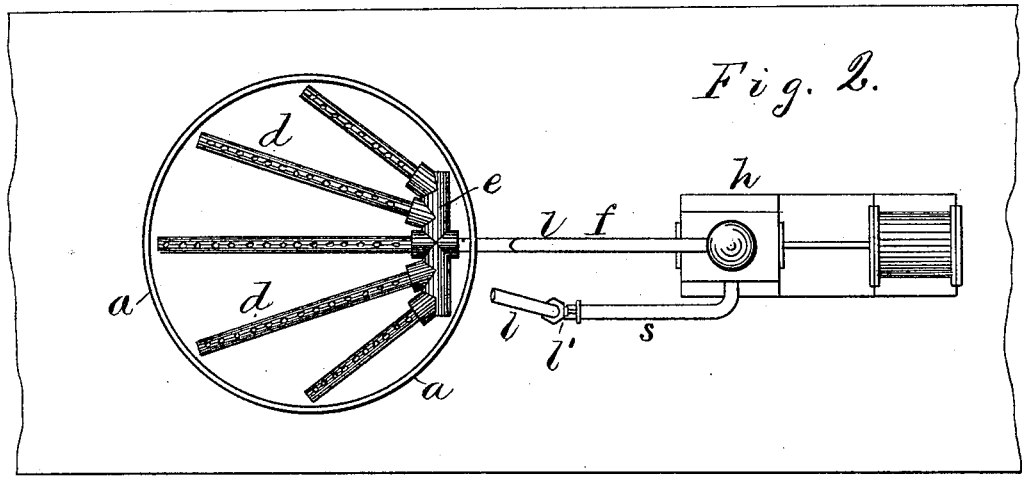
Figure 3:
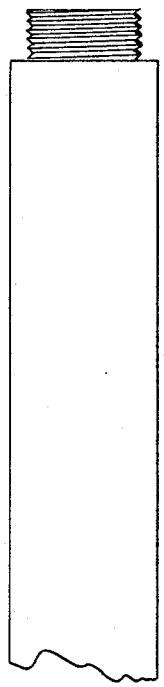
Figure 4:
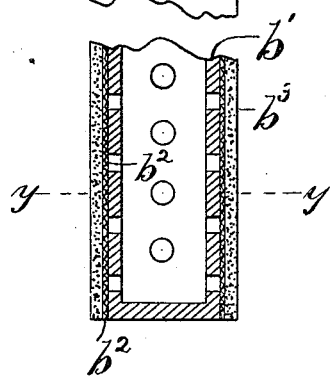
Figure 4:
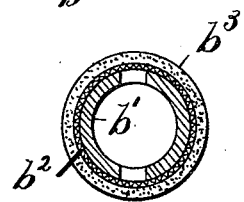

My improvement is shown in the annexed drawings, in which Figure 1 is an elevation (with the filter-casing in section) of the entire apparatus; and Fig. 2, a plan of the same, with the casing shown in section on line $x$ $x$ in Fig. 1. Fig. 3 is a side view of one of the tubular filtering-diaphragms, with a portion broken away to show its porous construction; and Fig. 4 is a cross-section of the same on line $y$ $y$ in Fig. 3.

The invention is shown applied to a vertical cylindrical filter and the water-current produced by a steam-pump.

$a$ is the filter-casing.

$b$ are filtering-diaphragms or media of cylindrical, flat, or prismatic form, as described in my prior patent application; or they may be made of any desired shape or material, as their special construction is no part of my present invention.

The tubular diaphragm shown herein and illustrated in Figs. 3 and 4 consists in a perforated metallic tube, $b'$, having wire-cloth, $b^2$, wrapped around its exterior and a coating, $b^3$, of artificial stone applied in a plastic state over the wire-cloth and hardened thereon.

$c$ is a mass of sand placed in the casing about the filtering-diaphragms, and may be supplied in sufficient volume to wholly cover them, as shown in the dotted line $c$ in Fig. 1, or in lesser quantity, if desired.

$d$ are inlet-pipes arranged upon the bottom of the casing. $e$ is a header to which they are connected. $f$ is a pipe leading to such header through the discharge-nozzle $g$ upon the steam-pump $h$.

The suction-pipe $s$ of the pump is connected with a water-supply pipe, $k$, and also with the upper part of the filter-casing, by a pipe, $l$, the pipes being provided with cocks $k'$ and $l'$, so that the supply from each source to the pump may be easily regulated.

When in operation the filter-casing is filled with water, and the fluid supplied through the inlet-pipes $d$ rises between the various filtering-diaphragms and agitates the abrading material in contact therewith, the surplus of fluid not filtered passing off near the top of the filter, where a guard or baffle-plate, $n$, may be arranged in front of the outlet-aperture to prevent the sand from escaping thereat.

The suction-pipe of the pump may be connected exclusively with the top of the filter by closing the cock $k'$, in which case the pump would operate solely to circulate the fluid within the filter through the abrading material to agitate it violently; but, owing to the casing being tightly closed and wholly filled with fluid, and the amount drawn from it being exactly equal to the amount restored to it by the pump when operating, it is obvious that no pressure would be exerted upon the filter-diaphragms, and no fluid would be filtered and passed out by the pipe $m$. Upon the contrary, when the cock $l'$ is closed and the cock $k'$ opened, the pump would be supplied wholly with fresh water, and all the fluid delivered to the casing would be forced through the diaphragms in a filtered condition.

The pump is operated to produce sufficient pressure therein to force the water through the filtering-diaphragms, from which it is discharged by the pipe $m$ and cock $m'$.

In the present invention the volume of water passed through the filter-casing is intended to be considerably in excess of its filtering capacity to effectually agitate the abrading material, the pump-cylinder being supplied at each stroke partly by the fresh fluid from the supply-pipe $k$, which would of course equal the amount discharged from the pipe $m$ and partly from the pipe $l$ with the fluid already passed through the casing.

It is intended that the pump shall be operated to produce within the casing a pressure sufficient to force the fluid through the filter-diaphragms, and, where such pressure is in excess of that existing in the supply-pipe $k$, a regulating-valve may be inserted in the pipe $l$, to reduce the pressure of the fluid before it is delivered to the pump to equal that in the supply-pipe $k$. Such device is represented in Fig. 1 as a regulator-valve, $l^2$, actuated by the fluid-pressure in a cylinder, $l^3$, the latter being connected with the fluid in the pipe $l$ upon the side nearest to the pipe $k$. Such pressure-regulator thus equalizes the pressure of the fluid (from both sources) where the suction-pipe $s$ is supplied therewith, and the pump is thus enabled to draw at option from either of the pipes $k$ or $l$ by regulating the cocks therein. Either cock may therefore be wholly closed, as described above, or each may be opened in the required degree. The cock $k'$ may therefore be regulated to supply just such volume of water as will pass through the filtering-surfaces under the pressure generated; but it is obvious that if the capacity of the pump is greater than the filtering capacity of the diaphragms the excess delivered by the pump will positively be returned to its suction through the cock $l'$ and operate again to agitate the sand.

The casing may be made with an open top, as indicated by the dotted lines $a'$ in Fig. 1, provided a sufficient head of water be maintained within the casing to force the fluid through the filtering-diaphragms to their discharge-pipe $m$. In such case the return-pipe $l$ would be connected with the casing at the desired water-level, and would operate to draw off to the pump the excess of water not delivered by the pipe $m$.

It is obvious that the casing merely serves as a receptacle for the diaphragms, the fluid, and the abrading material, and the form or kind of receptacle is therefore entirely immaterial.

It will be noticed that the sand or other abrading material introduced into the filter-casing is manifestly not designed to perform filtering functions, and that any filtration effected by such abrading material is wholly immaterial to the invention itself. It will also be understood that in my invention the inlet-pipes $d$ are not washer-pipes in the sense of supplying water exclusively to wash the filtering material, as they operate to supply the water for filtration as well as the water for agitating the abrading material. It will also be understood that the filtering-diaphragms in my invention require a strength and consistency to sustain an abrading action upon their surface, and are not disintegrated by the current of fluid, as in filters employing a filtering agent consisting of loose granular material. The entering fluid serves to agitate the abrading material on its passage to be filtered, and the inlet-pipes $d$ furnish continuously all the fluid which is filtered, and may be introduced within the casing at any point to agitate the abrading material in the desired manner.

It is obvious that the abrading material, if placed within the casing in a large quantity, may operate incidentally to a small degree to arrest the impurities in the water and to partially purify the same before it operates upon the filter-diaphragms; but it will be understood that such filtering function of the sand is wholly immaterial to my invention, and that the sand or other abrading material may be used in much smaller quantity and be mingled with the fluid so thoroughly as to possess no filtering function whatever.

Having thus set forth my invention, what I claim herein is—

1. In a filtering apparatus, the combination, with a filter casing or receptacle containing one or more porous filtering-diaphragms, and loose abrading material in contact with such diaphragm or diaphragms, of a pump for circulating water within the receptacle, a filter inlet-pipe connected with the outlet of the pump, and discharging water within such abrading material, an outlet-pipe near the upper part of the receptacle, connected with the suction of the pump, and a waste-pipe for discharging the impurities from the receptacle, substantially as herein set forth.

2. In a filtering apparatus, the combination, with a filter casing or receptacle containing one or more porous filtering-diaphragms, and loose abrading material in contact with such diaphragm or diaphragms, of a pump for circulating water within the receptacle, a filter inlet-pipe connected with the outlet of the pump, and discharging water within such abrading material, an outlet-pipe near the upper part of the receptacle, connected with the suction of the pump, a water-supply pipe connected also with such suction, and a waste-pipe for discharging the impurities from the receptacle, substantially as herein set forth.

3. In a filtering apparatus, the combination, with a filter casing or receptacle, $a$, containing one or more porous filtering-diaphragms, and loose abrading material in contact with such diaphragm or diaphragms, of a pump for circulating water within the receptacle, a filter inlet-pipe, $f$, connected with the outlet of the pump, and discharging water within such abrading material, a casing outlet-pipe, *l*, near the upper part of the receptacle, connected with the suction of the pump, and provided with a pressure-regulating valve, substantially as set forth, and a water-supply pipe, *k*, connected also with the suction of the pump, and cocks *k'* and *l'*, inserted, respectively, in the pipes *k* and *l*, the whole being arranged and operated as and for the purpose set forth.

4. In a filtering apparatus, the combination, with a filter casing or receptacle containing one or more porous filtering-diaphragms, and loose abrading material in contact with such diaphragm or diaphragms, of a pump for circulating water within the receptacle, a series of perforated inlet-pipes located at the bottom of the filter-casing, and distributing water within the abrading material, an outlet-pipe near the upper part of the receptacle, connected with the suction of the pump, a water-supply pipe, connected also with such suction, and a waste-pipe for discharging the impurities from the receptacle, substantially as herein set forth.

In testimony whereof I have hereunto set my hand in the presence of two subscribing witnesses.

JOHN W. HYATT.

Witnesses:
FRANK L. MORTON,
THOS. S. CRANE.